W. C. CHAPMAN.
INTERNAL COASTER BRAKE LOCK.
APPLICATION FILED MAY 20, 1914.
1,141,774.
Patented June 1, 1915.
2 SHEETS—SHEET 1.
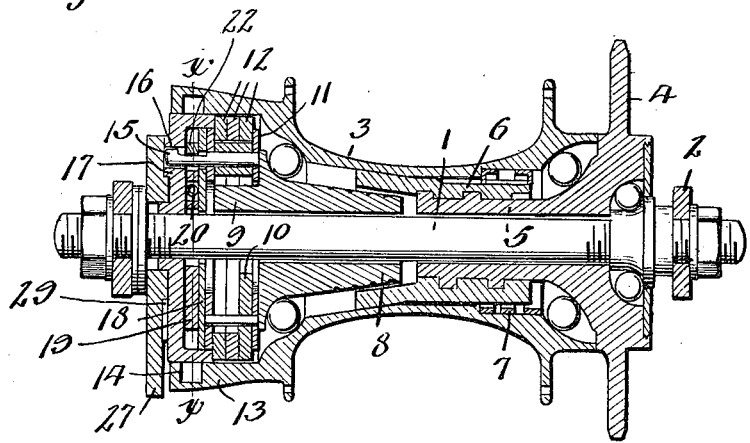
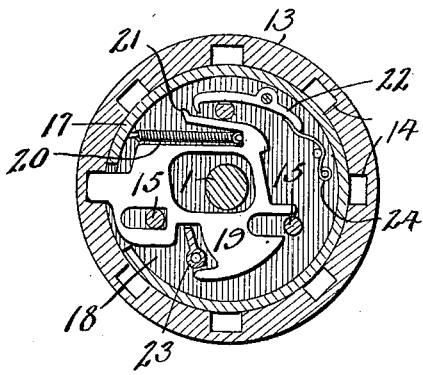
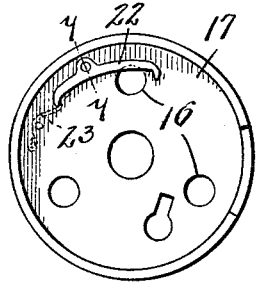
Witnesses
Inventor
W. C. Chapman,
By Victor J. Evans
Attorney W. C. CHAPMAN.
INTERNAL COASTER BRAKE LOCK.
APPLICATION FILED MAY 20, 1914.
1,141,774.
Patented June 1, 1915.
2 SHEETS—SHEET 2.
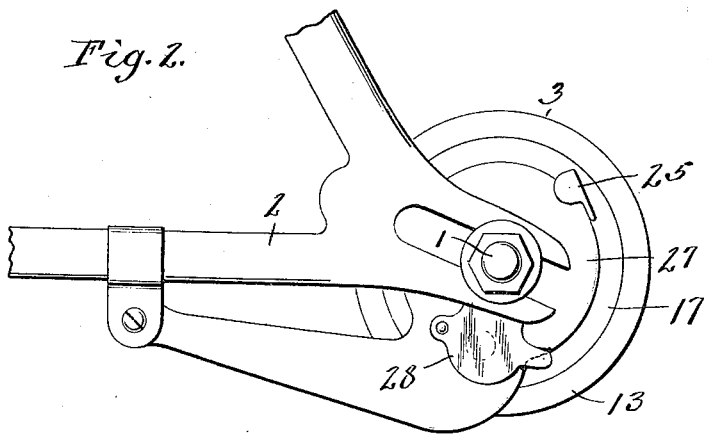
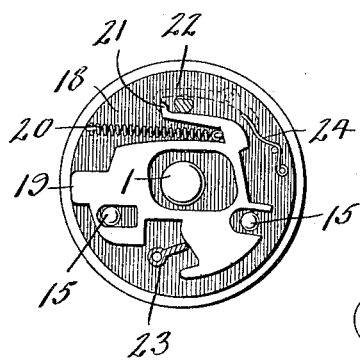
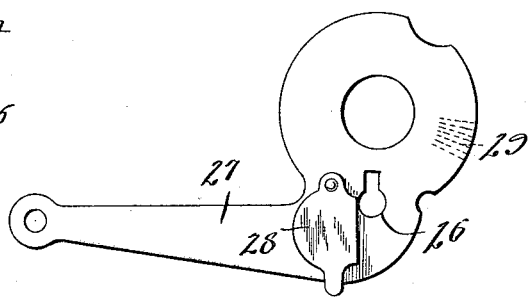
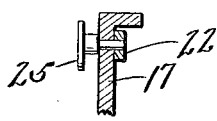
Witnesses
Inventor
W. C. Chapman,
By Victor J. Evans
Attorney

UNITED STATES PATENT OFFICE.

WILLIAM C. CHAPMAN, OF GROVETOWN, GEORGIA, ASSIGNOR OF ONE-HALF TO JOHN F. BRICKLE, OF AUGUSTA, GEORGIA.

INTERNAL COASTER-BRAKE LOCK.

1,141,774.   Specification of Letters Patent.   Patented June 1, 1915.

Application filed May 20, 1914. Serial No. 839,845.

*To all whom it may concern:*

Be it known that I, WILLIAM C. CHAPMAN, a citizen of the United States, residing at Grovetown, in the county of Columbia and State of Georgia, have invented new and useful Improvements in Internal Coaster-Brake Locks, of which the following is a specification.

The invention provides novel means for preventing the unauthorized use or pilfering of bicycles and analogous machines provided with a coaster brake.

The invention consists of a lock mechanism associated with the coaster brake and located internally thereof so as to be out of the way and hidden from view and thereby not to detract from the appearance of the machine or be so noticeable.

The invention consists of a lock mechanism embodying a lock bolt which is arranged within the hub or a portion thereof and is adapted to engage the hub or part inclosing the lock mechanism thereby preventing unauthorized use of the machine or the misappropriation thereof.

The invention further consists of novel means for holding the lock bolt retracted when withdrawn by means of the key and means for tripping such lock bolt whereby the same is released when required so as to come into play and lock the wheel.

The invention consists of the novel features, details of construction and combination of parts, which hereinafter will be more particularly set forth, illustrated and claimed.

In the drawings hereto attached:—Figure 1 is a central longitudinal section of a coaster brake and adjunctive parts provided with a lock mechanism embodying the invention. Fig. 2 is an end view showing a locking arm for holding the brake band frame against rotary movement. Fig. 3 is a sectional view on the line *x—x* of Fig. 1 showing the lock mechanism and its relation to the hub of the wheel. Fig. 4 is a detail view of the lock mechanism with the cap plate removed and showing the lock bolt held in retracted position. Fig. 5 is a detail view of the cap plate as seen from the inner side. Fig. 6 is a detail view of the arm for holding the brake band frame in fixed position. Fig. 7 is a detail section taken on line *y—y* of Fig. 5.

Corresponding and like parts are referred to in the following description, and indicated in all the views of the drawings, by the same reference characters.

The axle 1, fork members 2 supporting the axle 1 and hub 3 are well known parts of a bicycle or analogous machine adapted to receive the elements comprising a coaster brake.

The numeral 4 designates a sprocket wheel which is loose upon the axle 1 and has a screw 5 formed with or connected thereto in any manner.

A sleeve 6 is mounted upon the screw 5 and coöperates therewith in the well known manner, such sleeve being provided at one end with inner and outer clutch members and such screw receiving the usual drag spring 7.

A friction cone 8 is mounted upon the axle and coöperates with the inner clutch member of the sleeve 6.

Lugs 9 project outwardly from the friction cone 8 and are adapted to engage dogs 10 mounted upon a frame 11 which is held stationary and receives the brake bands 12 which are expanded by means of the lugs 9 upon back pedalling. These several parts are of well known coaster brake construction and are illustrated to demonstrate the application of the present invention.

The brake drum 13 at one end of the hub 3 is extended and is formed upon its inner side with a plurality of openings 14 any one of which is adapted to receive the projecting part of the lock bolt. The pins 15 upon which the dogs 10 are pivotally mounted project outwardly from the frame 11 and enter openings 16 formed in the cap 17 which incloses the lock mechanism and is fitted to the frame 11 and secured upon the axle 1 by being threaded thereon.

A plate 18 is fitted against the outer side of the frame 11 and is provided with openings to receive the pins 15 which serve to hold such plate in position. The lock mechanism is fitted to the plate 18 and embodies a lock bolt 19 which is mounted to receive a rectilinear movement, said lock bolt being retained in place and directed in its movements by the pins 15.

A spring 20 of the helical contractile type normally exerts a force tending to hold the lock bolt projected.

An arm 21 forming a part of the lock bolt is adapted to engage a detent 22 to hold the lock bolt in retracted position when thrown inward by means of the key 23. The detent 22 is acted upon by means of a spring 24 so that when the lock bolt is withdrawn by the action of the key the stop at the end of the detent engages with a stop of the arm 21 and holds the lock bolt in the withdrawn position A finger piece 25 is connected with the detent 22 and when pressed upon disengages the detent from the arm 21 thereby releasing the lock bolt 19 which is shot forward by the action of the spring 20 so as to engage any one of the openings 14 of the brake drum 13 thereby locking the wheel against rotation. The finger piece 25 is located exteriorly of the cap 17 so as to be conveniently tripped when it is required to release the lock bolt. The cap 17 is formed with a key hole which registers with a key hole 26 formed in the arm 27 by means of which the cap 17 and frame 11 are held from turning. A guard 28 closes the key hole 26.

Interlocking teeth 29 are formed upon the adjacent sides of the arm 27 and cap 17 thereby holding such cap from turning, the frame 11 being held from turning by means of the pins 15 in the manner hereinbefore stated.

It will be understood from the foregoing taken in connection with the accompanying drawings that the invention provides an essentially internal locking mechanism for coaster brakes which is simple, effective and susceptible of being readily applied to any type of coaster brake, the construction being such as not to detract from the appearance of the hub or brake and which at the same time is hidden from view and protected, the brake drum receiving and forming a housing for the lock mechanism. The lock bolt is normally held withdrawn or in retracted position by means of the detent 22 and when the machine is left unattended the lock mechanism may be thrown into action by pressing lightly upon the finger piece 25 which disengages the detent 22 from the lock bolt, the latter being projected by means of the spring 20 so as to enter any one of the openings 14 of the brake drum and thereby prevent rotation of the wheel in either direction.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

Having thus described the invention, what is claimed as new is:—

1. In a coaster brake embodying a brake drum carried by the hub and a coöperating brake member, a supporting frame for such brake member and a lock mechanism for holding the wheel against rotation mounted upon the supporting frame and adapted to be inclosed by means of the brake drum so as to be concealed thereby.

2. In a coaster brake embodying a brake drum connected with the hub, a coöperating brake member, a supporting frame for such brake member, means for holding such drum in fixed position, and a lock mechanism mounted upon the brake member supporting frame and adapted to engage the brake drum to hold the wheel against rotation.

3. In a coaster brake embodying a brake drum carried by the hub of the wheel, a coöperating brake member, a supporting frame for the brake member, a lock bolt mounted upon the brake member supporting frame and adapted to engage the brake drum, a spring normally tending to project the lock bolt and a detent mounted upon the brake member supporting frame to engage the lock bolt and hold the same in retracted position.

4. In a coaster brake, the combination of a brake drum connected with a wheel hub, a coöperating brake member, a supporting frame for the brake member, a lock mechanism mounted upon the brake member supporting frame and adapted to coöperate with the brake drum, a cap for inclosing the lock mechanism and held to the brake member supporting frame and means for securing the said cap to the frame of the machine to prevent turning.

In testimony whereof I affix my signature in presence of two witnesses.

WILLIAM C. CHAPMAN.

Witnesses:
H. C. BUSH,
Q. V. RUSSELL.

Copies of this patent may be obtained for five cents each, by addressing the "Commissioner of Patents, Washington, D. C."